A. P. MASSEY.
Horse Hay-Rakes.

No. 154,335. Patented Aug. 25, 1874.

Witnesses.
A. F. Cornell
S. C. Raymond

Inventor.
A. P. Massey
Per Burridge & Co.
Attys.

2 Sheets--Sheet 2.

A. P. MASSEY.
Horse Hay-Rakes.

No. 154,335. Patented Aug. 25, 1874.

Witnesses:
A. J. Cornell.
S. C. Raymond.

Inventor.
A. P. Massey
Per. Burridge & Co
Attys.

UNITED STATES PATENT OFFICE.

ALBERT P. MASSEY, OF CLEVELAND, OHIO.

IMPROVEMENT IN HORSE HAY-RAKES.

Specification forming part of Letters Patent No. 154,335, dated August 25, 1874; application filed June 30, 1874.

*To all whom it may concern:*

Be it known that I, ALBERT P. MASSEY, of Cleveland, in the county of Cuyahoga and State of Ohio, have invented new and useful Improvements in Horse Hay-Rakes, of which the following is a description, reference being had to the accompanying drawings, making a part of this specification, in which—

Figure 1:
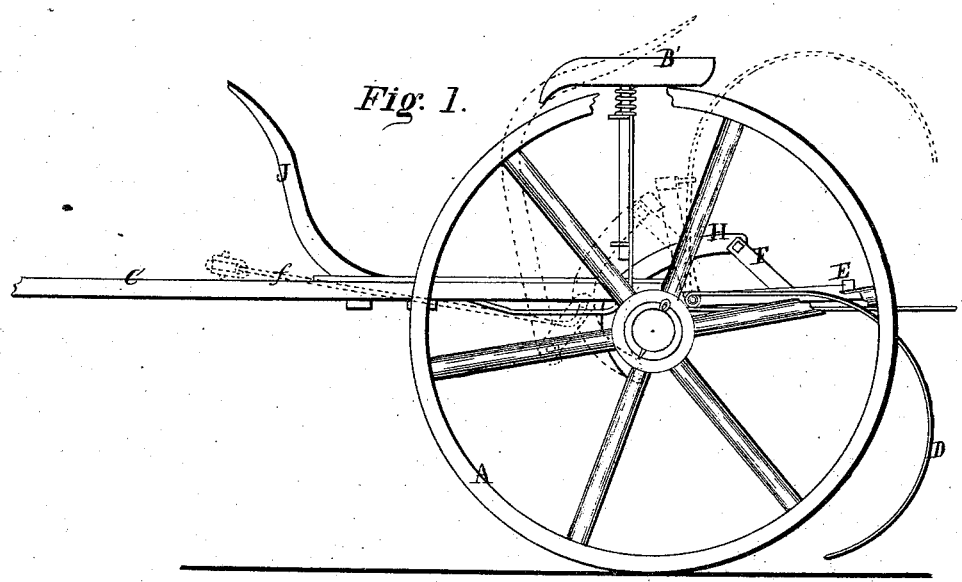
Figure 2:
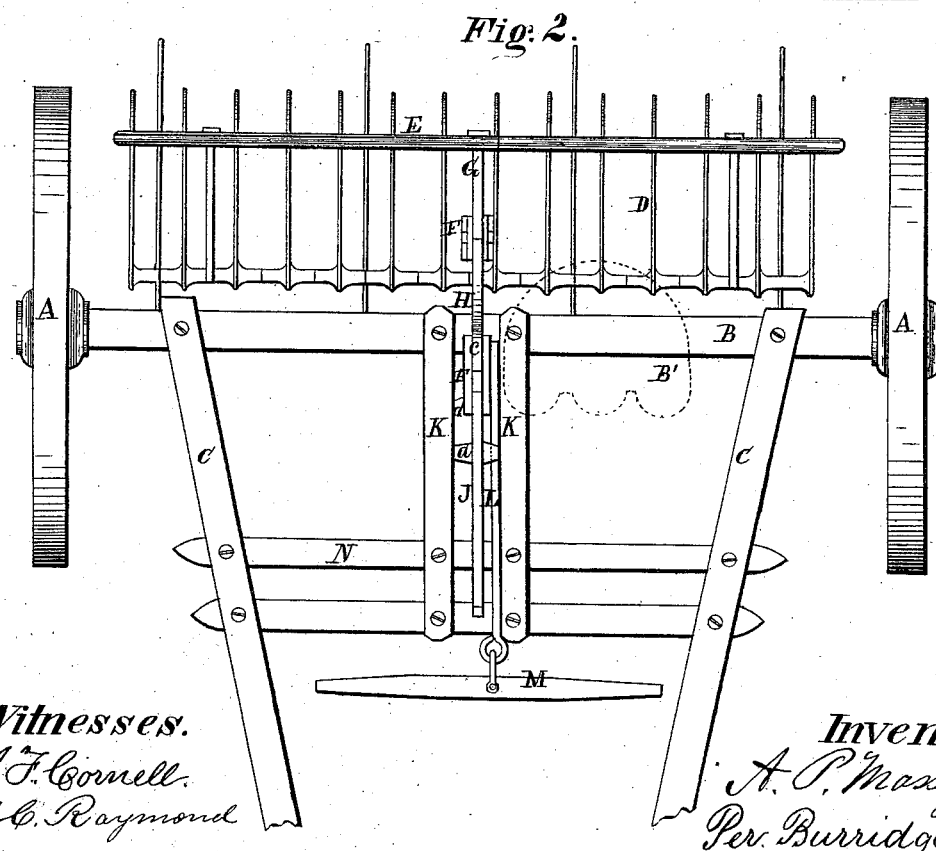
Figure 3:
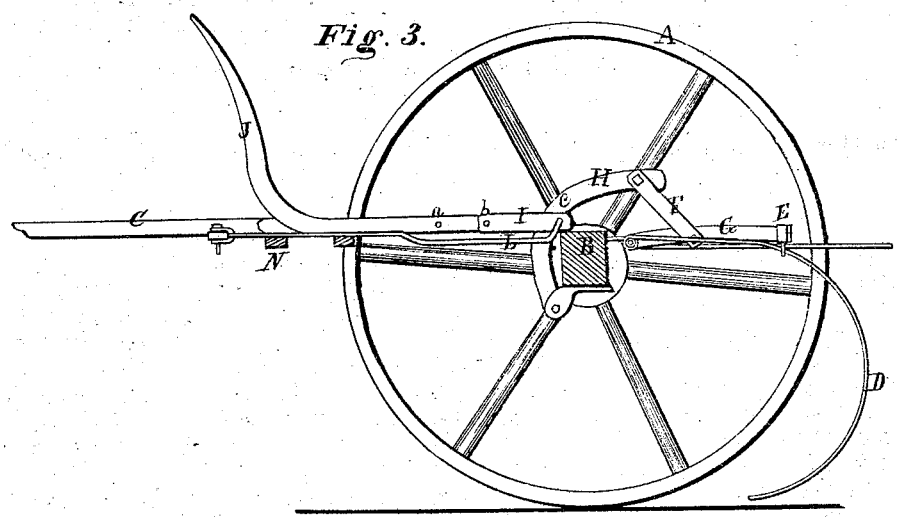
Figure 4:
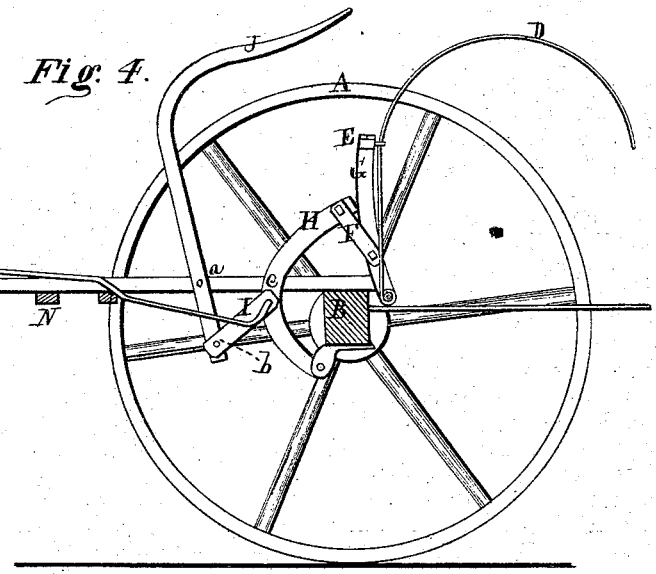

Figure 1 is a side elevation of the rake. Fig. 2 is a plan view. Figs. 3 and 4 are vertical sections.

Like letters of reference refer to like parts in the several views.

The nature of this invention relates to a device for lifting the rake of a horse hay-rake by means of the horse by which the rake and carriage are drawn. Of the construction of the aforesaid device, and of the operation of the same, the following is a detailed description:

A A represent the wheels of the rake, whereof B is the axle-tree, to which are secured in a rigid manner the thills C. To the rear side of the axle is attached in a free manner the rake D, which is lifted from the ground for discharging the gathered hay, by the device above referred to. Thus, to the bar E, Fig. 2, of the rake is pivoted a strap or link, F, through the intervention of the brace G. The upper end of the link F is pivoted to one end of the arm H, whereas the opposite end of said arm is hinged to the axle-tree. To said arm H is pivoted one end of a link, I, Figs. 3 and 4. The opposite end of the link is pivoted to the lever J, hung between the pieces K at $a$, Fig. 2, which forms the fulcrum of the lever. To the pivoted point $c$ of the link I is connected one end of the draw-bar L, to the opposite end whereof is attached the whiffletree M, whereby the rake is drawn by the horse.

The practical operation of the above-described device is as follows: The position of the rake and of the lifting device, as shown in Figs. 1 and 2, is such as when the teeth of the rake are on the ground, in the act of raking, in said position it is retained by the lever J, which, in its connection with the arm H by means of the links or straps I, brings the pivotal points $a$, $b$, and $c$ of the lever and links all in a right line, or a little above the line of draft of the bar L, as shown in Fig. 3.

It will be obvious that, in consequence of the line of draft being in or above the pivotal points referred to, the rake is locked, and therefore cannot therefore lift up, nor can the pivotal point $b$ rise above the line of draft, for the reason that the free end of the lever J rests upon the cross-bar N, which retains the pivotal connections in a right line.

In order to lift the rake, the operator, while on the seat B, draws the lever J toward him, thereby throwing the pivotal point $b$ below the line of draft, the result of which will be the elevation of the rake by the continued drawing of the horse upon the draw-bar L. The rake when elevated, and the changed position of the lifting device, are shown in Fig. 4, also indicated by the dotted lines in Fig. 1.

It will be evident that, by the use of the above-described lifting device, the horse is made to assist the operator in discharging the hay from the rake. The peculiar arrangement of the arm H in its connection with the rake-head, by the intervention of the link F, is such that it moves or revolves in the same direction of the rake-head, thereby drawing the rake in a direction requiring the least power in any one position—that is to say, the links F are in the best position or relation to the rake-head to lift it incipiently and continuously, as will be evident from the fact that the lever J and link I are at right angles or nearly so, to the arm, as will be seen in Fig. 3. Hence, the initial action of the lever is applied at the best possible point for raising the rake, and, at the same time, the links F connecting the arm to the rake at $a$ have a large advantage of leverage, and which advantage increases as the rake contiues to rise.

In consequence of this right-angled relation of the lever J to the arm H, and the relation of the links F to the rake-head, and which relation becomes a right-angled one on lifting the rake, it will be obvious that said rake is raised with but little labor, and hence there is exerted upon the frame of the rake no hard or violent straining in lifting the rake.

What I claim as my invention, and desire to secure by Letters Patent, is—

1. The lever or arm H, pivoted to the axle B, links F, and brace G, arranged in combination with the rake D, in the manner as described, and for the purpose specified.

2. The lever J, link I, and draw-rod L, in combination with the lever or arm H, pivoted to the axle B, substantially in the manner as described, and for the purpose set forth.

ALBERT P. MASSEY.

Witnesses:
J. H. BURRIDGE,
A. F. CORNELL.